United States Patent [19]

Stearns

[11] Patent Number: 5,125,167

[45] Date of Patent: Jun. 30, 1992

[54] ORGANIC VAPOR CONTAINMENT AND RECYCLE SYSTEM FOR OPEN TANKS AND CONTAINERS

[75] Inventor: Donald M. Stearns, Cocoa, Fla.

[73] Assignee: PEC Research, Inc., Sharpes, Fla.

[21] Appl. No.: 494,457

[22] Filed: Mar. 16, 1990

[51] Int. Cl.[5] .................... F26B 21/00; F25D 17/08
[52] U.S. Cl. ................................... 34/77; 34/78; 62/93; 62/48.2; 165/111; 432/197
[58] Field of Search ................ 62/48.2, 47.1, 93; 165/111; 220/85 VR, 85 VS; 34/78, 75, 76, 77; 432/197

[56] References Cited

U.S. PATENT DOCUMENTS

| | | | |
|---|---|---|---|
| 3,098,362 | 7/1963 | Sohda et al. | 62/48.2 |
| 3,733,847 | 5/1973 | Powell | 62/47.1 |
| 4,012,847 | 3/1977 | Rand | 34/77 |
| 4,348,174 | 9/1982 | Spigarelli | 34/78 |

Primary Examiner—Albert W. Davis, Jr.
Attorney, Agent, or Firm—Antonelli, Terry, Stout & Kraus

[57] ABSTRACT

A process for the containment and recycle of organic vapors from an open container or tank that utilizes a chilled gas blanket over the surface of the organic liquid, with a continuous recirculaton of the chilled gas through a condenser heat exchanger for cooling the gas flow and condensing and returning the condensed vapor to the tank or container. Included are the means of distribution of the recirculated chilled gas, the means of collecting the recirculated chilled gas, the means of providing an enclosed chilled gas recirculation system, the apparatus for condensing the vapor to liquid, the apparatus for collecting and recycling the condensed vapor, the apparatus for providing a full open access to the top of the tank or container and the apparatus for control of the flow of the recirculated chilled gas.

10 Claims, 8 Drawing Sheets

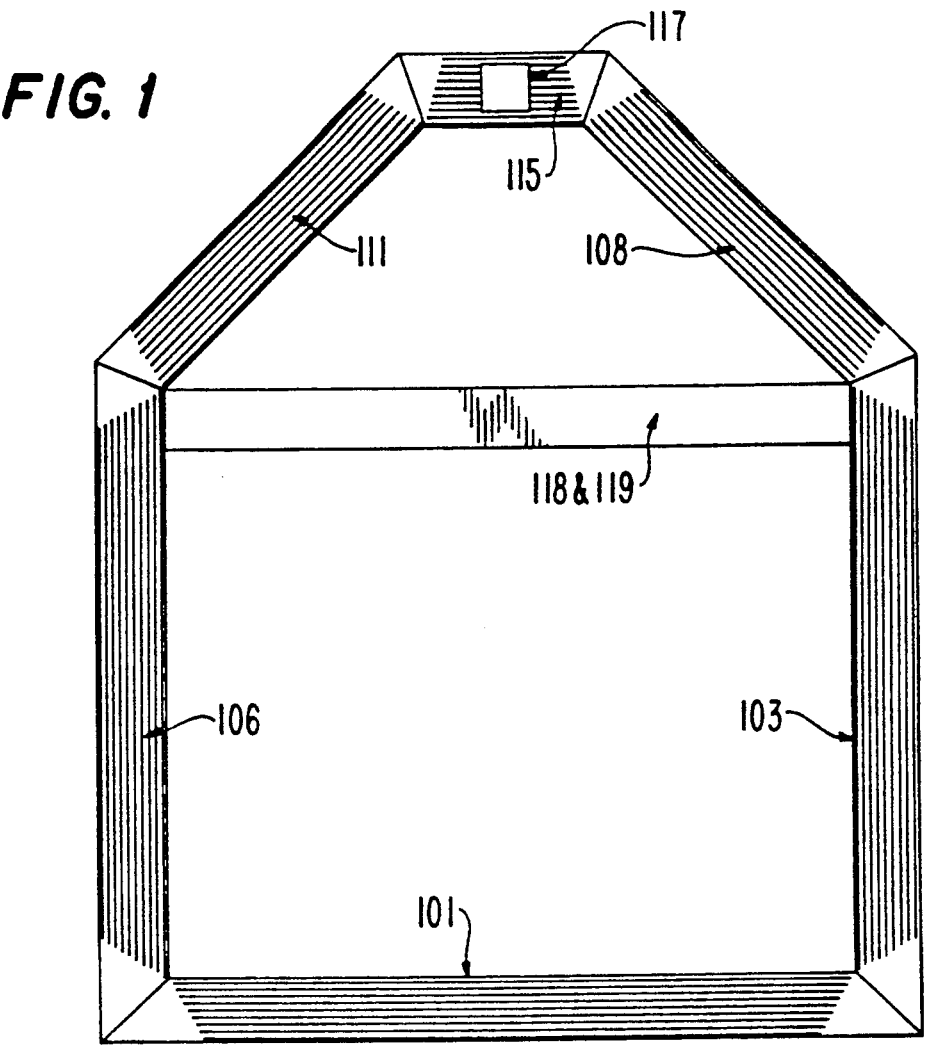
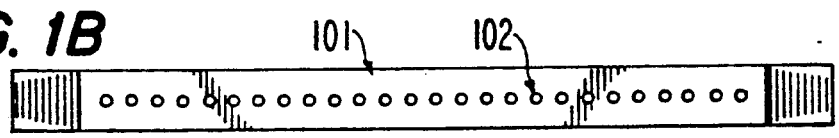

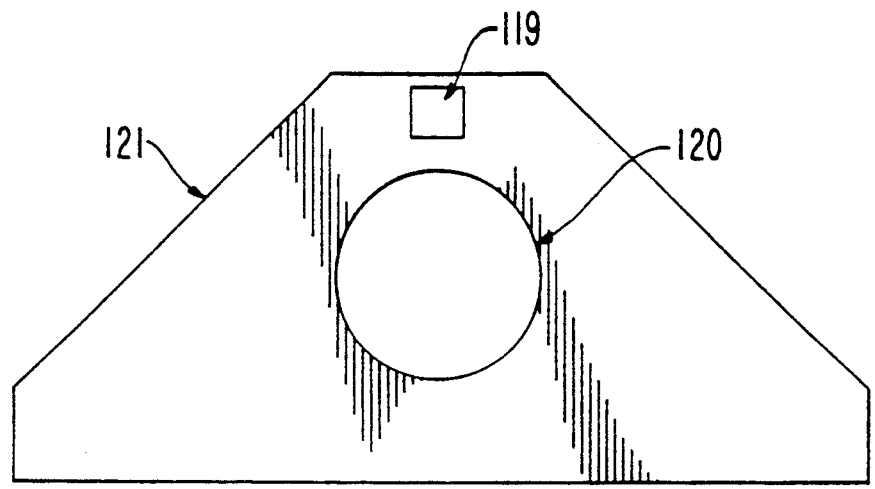
*FIG. 1E*
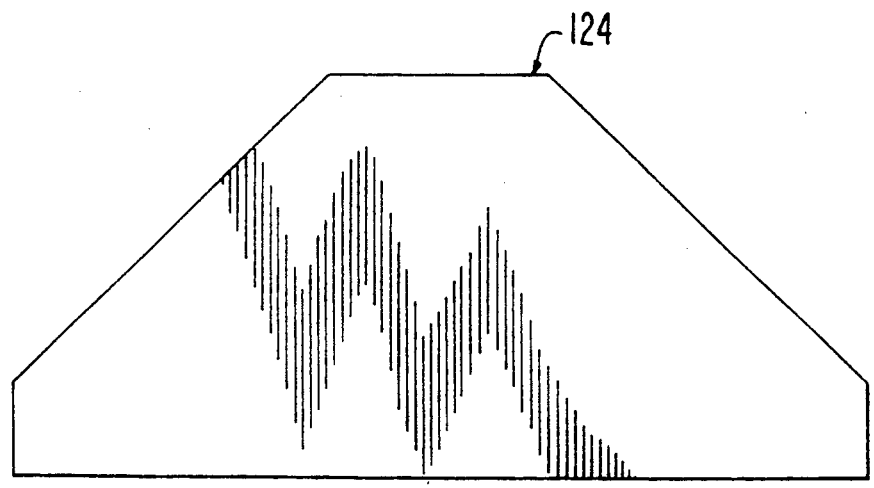
*FIG. 1F*
*FIG. 2A*
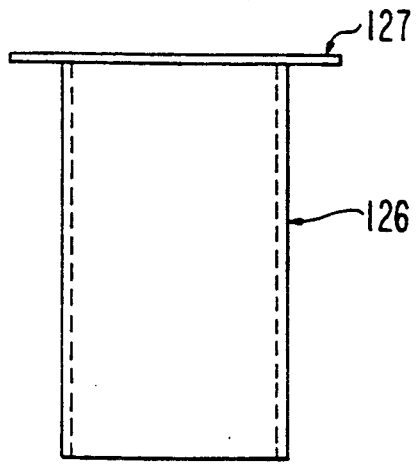
*FIG. 2B*
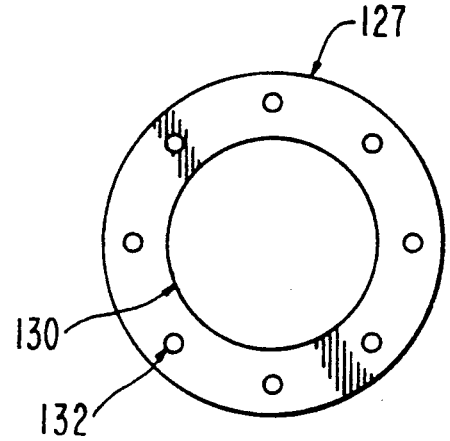

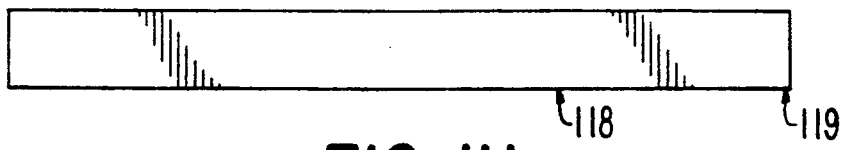
FIG. 1G
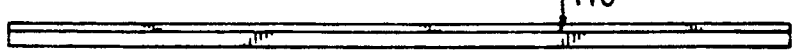
FIG. 1H   FIG. 1J
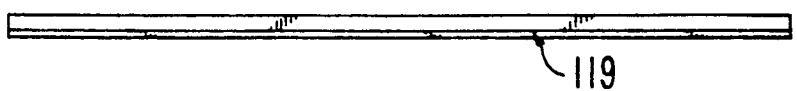
FIG. 1I   FIG. 1K
FIG. 1L
FIG. 1M
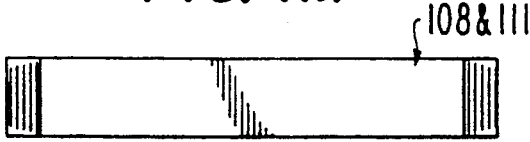
FIG. 1N
FIG. 1O

ORGANIC VAPOR CONTAINMENT AND RECYCLE SYSTEM FOR OPEN TANKS AND CONTAINERS

BACKGROUND OF THE INVENTION

Vaporization of organic materials from open tanks caused by exposure to normal indoor or medium to high outdoor temperatures provides danger to humans from the toxic effect on their bodies, as well as destruction of the earth's atmosphere, explosion hazards and fire dangers. Chlorinated organic materials provide a special danger due to toxic effect on humans and the effect on all components of the earth's atmosphere, including water vapor, oxygen, ozine, carbon dioxide and sunlight.

Attempts have been made to control the problem of vaporization from the standpoint of explosion and fire hazards by the use of an inert gas blanket such as nitrogen. This method did nothing to prevent vaporization of the organic material, but did provide an environment that prevents the combination of the organic material with oxygen, thus preventing fire and explosions.

Control of vaporization of organic materials has been limited to open ventilation systems, that in all cases result in discharge into the atmosphere of large amounts of organic material with the accompanying slow destruction of the air quality.

The present invention provides cooling of a recirculated gas stream, as well as a condenser for the recycle of the organic material in an enclosed chill gas blanket over the top surface of the liquid.

Collection and return of the condensed vapors provide a special problem due to the gas flow across the liquid surface of the tank and in the condenser section of the system. To avoid entrainment of the condensed vapor, a liquid collection ring is used in the top of the chilled water collector header of the condenser heat transfer unit. After collection, the liquid is returned by a drain pipe to the tank at a point below the surface of the liquid. This is an important factor in allowing the flow of gas across the surface of the liquid which is an opposite design approach to the past vaporization control systems which limited the amount of gas flow in order to limit vaporization.

SUMMARY OF THE INVENTION

The process and the apparatus of this invention represent a new approach to solving the problem of the vaporization of organic material from the surface of the material by temperature reduction at the interface of the liquid and gas phase. The reduction of temperature at the interface reduces the rate of vaporization of the organic material into the gas phase and further reduction in temperature causes condensation of the organic vapor in the gas stream.

As all gases such as air or nitrogen become more dense as the temperature of the gas is lowered, they provide a heavier blanket over the surface than the same or similar gases at higher temperatures. This higher density effect prevents higher temperature gases from entering the cold gas blanket of the open tank.

The air or nitrogen, that would be normally used as the chilled gas blanket, must be continuously recirculated across the top of the liquid gas interface to a heat transfer device in order to maintain the chilled gas at a suitable temperature to minimize vaporization. Due to the lower temperature of the gas, with its resulting high density, the cover of the tank can be opened with minimum release of vapor from the organic material.

The chilled gas is introduced to the surface of the organic liquid with a multiport distributor covering three of the four sides of the tank. The fourth side is used as a gas collector to direct the gas flow into the inlet of the heat exchanger and condenser device. This circulation is caused by an axial flow fan located above the vertical heat exchanger and condenser device, which causes the gas flow to the inlet section and then through the vertical heat exchanger and condenser device.

The heat exchanger condenser is a unique vertical type, that not only uses the tubes, but also both sides of the chilled water distributor header and the lower chilled water collector header as heat exchange surfaces. Both the upper chilled water distributor header and the lower chilled water collector header also act as gas flow directional baffles in order to cause maximum contact time between the gas and the heat transfer surfaces. The chilled water return line from the lower chilled water collector heater is also used as a heat transfer surface and gas baffle by locating it in the center of the heat transfer tube bundle.

The top of the chilled water collector header has a built in ring type collector for condensed liquid deposited on both the multitube bundle and the return chilled water pipe located in the center of the multitube bundle. The collected organic liquid is returned to a point below the surface of the liquid in the tank by a drain pipe from the collector.

After passing through the axial flow fan located above the heat transfer condenser section, the gas is then directed into the combination support frame and gas distributor, which carries the chilled gas to three sides of the tank. The box section member has multiple holes drilled through the inside wall to uniformly distribute the gas over the complete surface of the liquid. The fourth side of the tank is used as an inlet to collect the gas introduced into the other three sides of the tank and direct its flow into the condenser heat exchanger section of the system. For a round tank 75% of the ring would be used for distribution of gas and 25% for collection.

The complete apparatus, with the exception of the chilled water supply, is a complete factory built integral unit ready for placement on an existing round or square open top tank requiring only the connection of a 110 volt single phase or 230 volt three phase power.

The tank gas seal system is a slow opening and closing power driven coil type roller cover using chemical resistant rubber, polymer film type synthetic material or coated fabric material as the sealing media. The drive system utilizes a torque limiting single cycle reversing gearmotor for attachment to the guide and drive roll and the coil storage roller for opening and closing the tank top seal. This tank seal device provides a means for a full opening single tank seal, as opposed to the sliding or swinging type tank covers currently in use. Both the hinged type tank cover and the sliding type tank cover cause high levels of loss of vapor from the tank surface due to unbalance that their opening and closing causes in the gas pressures of the gas blanket above the liquid surface of the tank. This, in turn, causes exterior gas to flow into the tank. The full opening roller type tank seal provides a gas compression for the gas blanket, reduces the unbalance in the internal pressure of the gas blanket and allows full access to the interior of the tank.

The action of the condensation of the vapor in the blanketing gas flow stream causes a slight vacuum to be created in the area of the inlet to the condenser heat exchanger section of the system. This vacuum causes exterior gas to flow into the tank when the cover is opened and therefore, prevents the escape of vapor from the gas/vapor blanket above the liquid surface in the tank.

As this system will apply to any organic material that has a positive vapor pressure at normal inside room temperatures or exterior temperatures during warm time periods, it can be applied to a great number of organic materials with different correction problems. Aluminum would be the most normal material of construction but other metals or plastics could be utilized to provide a construction suitable for the organic material to be contained.

The most common chilled gas that would be used for the gas blanket would be air, as it would provide complete compatibility for the in-system leakage which can not be totally eliminated. Nitrogen gas would be used under conditions of dangers of fire or explosion which would result from mixing the organic vapor with oxygen in the air blanket. If nitrogen was required for the gas blanket, it would be necessary to replace the in-system air leakage with replacement nitrogen as the oxygen content of the gas exceeded allowable limits for oxygen in the gas blanket.

The axial flow fan and the condenser heat exchanger would be operated on a continuous 24 hour per day basis with the exception that the fan operation would be stopped with the tank seal cover was open. The chilled water supply could utilize a control valve on the chilled water supply pipeline operated by a thermocouple located in the chilled water return pipeline to improve the efficiency of operation of the exterior chilled water supply system.

The tank seal system can be equipped with automatic time operated opening and closing controls, which would be suitable for the system use in continuous production automated operations. With the use of thermocouple control valves, a large number of individual tanks could be used with a single central chilled water system providing the necessary supply of chilled water to all of the systems. Exterior surfaces exposed to chilled gas flow would be insulated to prevent condensation of water vapor and the discharge flow from the axial fan could pass through a desiccant to remove internal water vapor.

BRIEF DESCRIPTION OF THE DRAWINGS

FIG. 1 is an assembly drawing of the support frame and gas distribution header.

FIGS. 1A and 1B are detail drawings of the front gas distribution header.

FIGS. 1C and 1D are detail drawings of the side gas distribution headers.

FIGS. 1G, 1H, 1I, 1J and 1K are detail drawings of the gas inlet collection control header and vertical closure members.

FIG. 1E is a plan view of the upper closure plate of the gas inlet collector.

FIG. 1F is a plan view of the lower closure plate of the gas inlet collector.

FIGS. 1L and 1M are detail drawings of the side sections of the gas recirculation header.

FIGS. 1N and 1O are detail drawings of the inlet section of the recirculated gas header.

FIGS. 2A and 2B are assembly drawings of the vapor condenser and gas heat exchanger housing.

DETAILED DESCRIPTION OF THE PREFERRED EMBODIMENTS

Figure 3A:
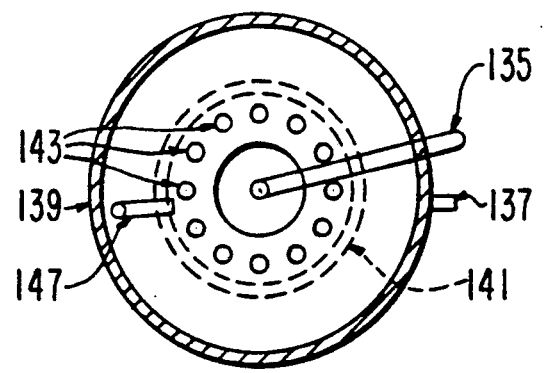
FIG. 3A is a plan view of the vapor condenser and heat exchanger unit.

FIG. 1 in the drawings shows an assembly drawing of the support base and the gas distribution headers which provides chilled gas flow into the tank and the support frame for the gas collection inlet to the condenser section. 101 is a box section providing a gas passage and gas distribution into the front section of the tank. 103 and 106 are box sections providing gas passage and gas distribution into both sides of the tank. 108, 111 and 115 are box sections providing gas passage to 101, 103 and and 106 in opening 117. 118 and 119 are support members which also form an inlet for the recirculated gas in the tank to the condenser section and provide uniform gas flow rates from all areas of the gas blanket.

FIGS. 1A and 1B are detail drawings of the front gas heater 101 showing the gas distribution openings 102.

FIGS. 1C and 1D are detail drawings of the side gas headers 103 and 106 showing the gas distribution openings 107.

FIGS. 1G, 1H, 1I, 1J and 1K are detail drawings of 118 and 119 which are two channel sections placed to provide a uniform opening for the flow of recirculated gas from the tank blanket into the vapor condenser and gas heat transfer section of the system. The channels also serves as support members for an upper 121 (FIG. 1E) and 124 (FIG. 1E).

Figure 6:
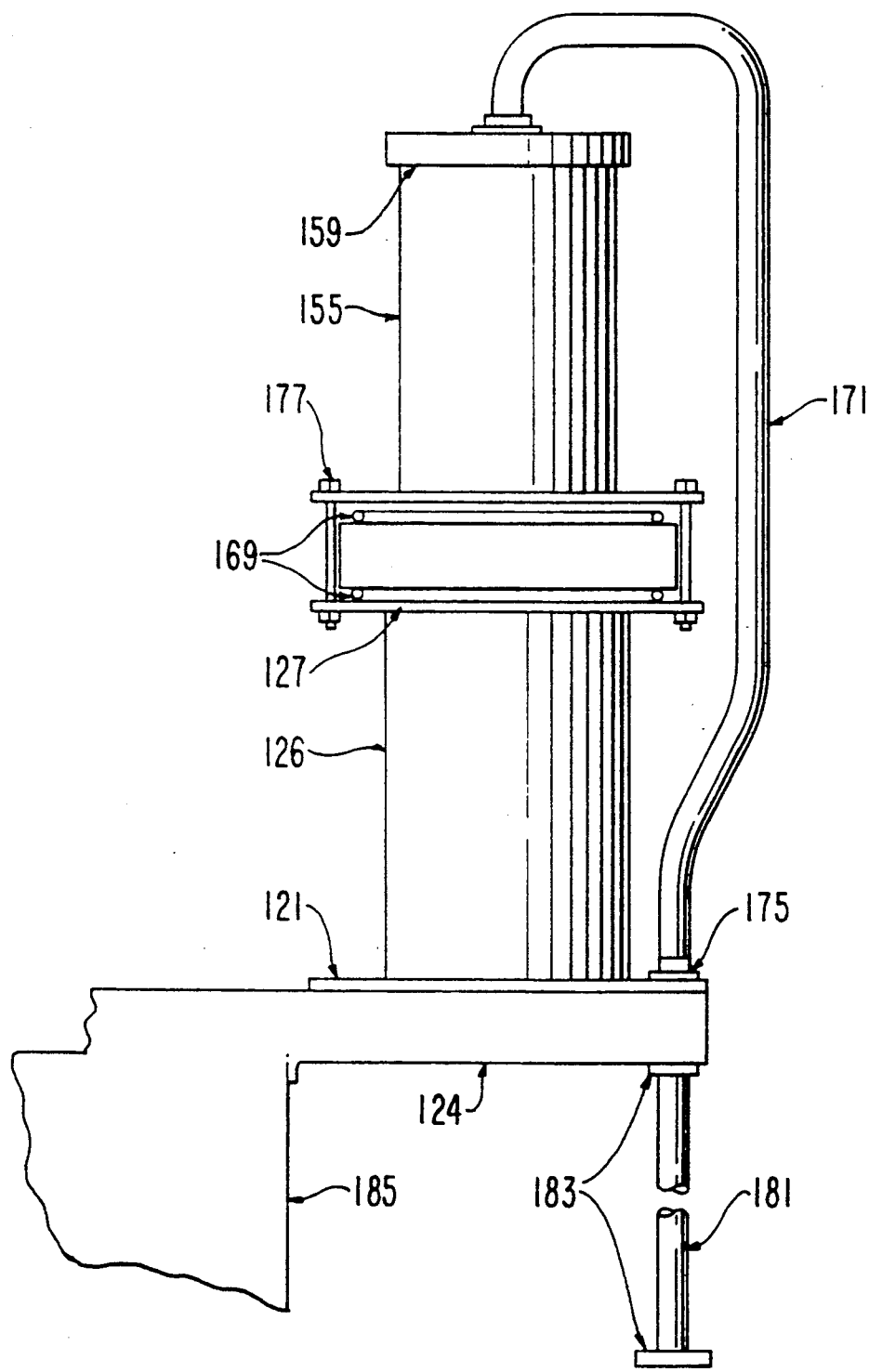
FIG. 6 is an assembly drawing of the vapor condenser and heat exchanger, the axial flow fan unit and structural support member.

FIG. 1E is a plan view of the upper enclosure plate 121 with gas flow inlet opening 119 above openings (FIG. 1C) and gas recirculation opening 120 to vapor condenser and gas heat transfer housing 127 (FIGS. 2 & 6).

FIG. 1F is a plan view of the lower enclosure plate of the gas inlet collector 124 which provides the bottom seal of the recirculated gas inlet collector.

FIGS. 1L and 1M are side enclosurers for the recirculated gas header providing the gas feed to the gas distribution header 101, 103 and 106 in FIG. 1.

FIGS. 1N and 1O show is the recirculated gas inlet header 115 providing gas flow into headers 108 and 111 FIG. 1F.

Figure 3:
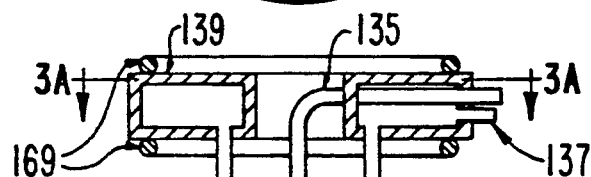
FIG. 3B is a section view of the vapor condenser and heat exchanger unit.

FIGS. 2A and 2B are assembly drawings of the vapor condenser and gas heat transfer housing with 126 being the vertical member of the housing and 127 being the horizontal member of the housing. 130 is the opening for the mounting of the condenser and heat exchanger assembly as shown in FIG. 3. 132 are bolt holes for clamping the condenser and heat exchanger in place as shown in FIG. 6.

FIGS. 3 and 3A show the condenser and gas heat exchanger consisting of 141 the chilled water collector, 139 the chilled water distributor header, 145 the condensed vapor return tubing, 143 the vertical heat exchanger tubes, 135 the chilled water return pipe, 137 is the chilled water inlet pipe and 169 O-ring seal gaskets.

FIGS. 3 is a sectional drawing of 139 the chilled water inlet distributor header with 169 seal O-rings and 141 the chilled water collector with condensed vapor collection ring and 145 condensed vapor return tubing.

Figure 4:
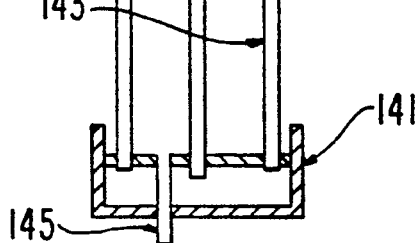
FIG. 4 is a plan view of the axial flow fan section.

FIG. 4 is an assembly drawing of the axial flow fan section with 153 the axial flow fan and motor, 155 the axial flow fan housing, 165 support ring for 163 the support screen for 167 desiccant cartridge with 157 optional replacement desiccant crystals. 149 is the axial fan housing mounting flange for attachment to the flange of the condenser and gas heat exchanger housing 127 shown in FIG. 2 bolts 127 (see FIG. 6) are used for attachment of the axial flow fan housing 149 to the flange of the condenser and gas heat exchanger housing 127 FIG. 2 and clamping the chilled water distributor header 130 (FIG. 3) between the two flanges.

Figure 4A:
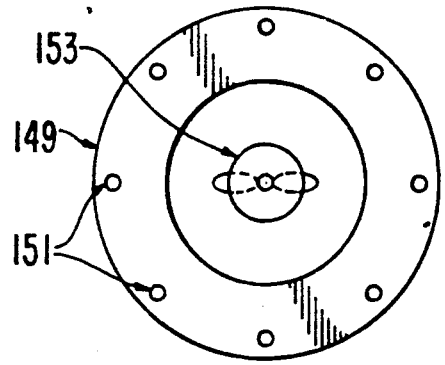
FIG. 4A is a section view of the axial flow fan unit.
Figure 5:
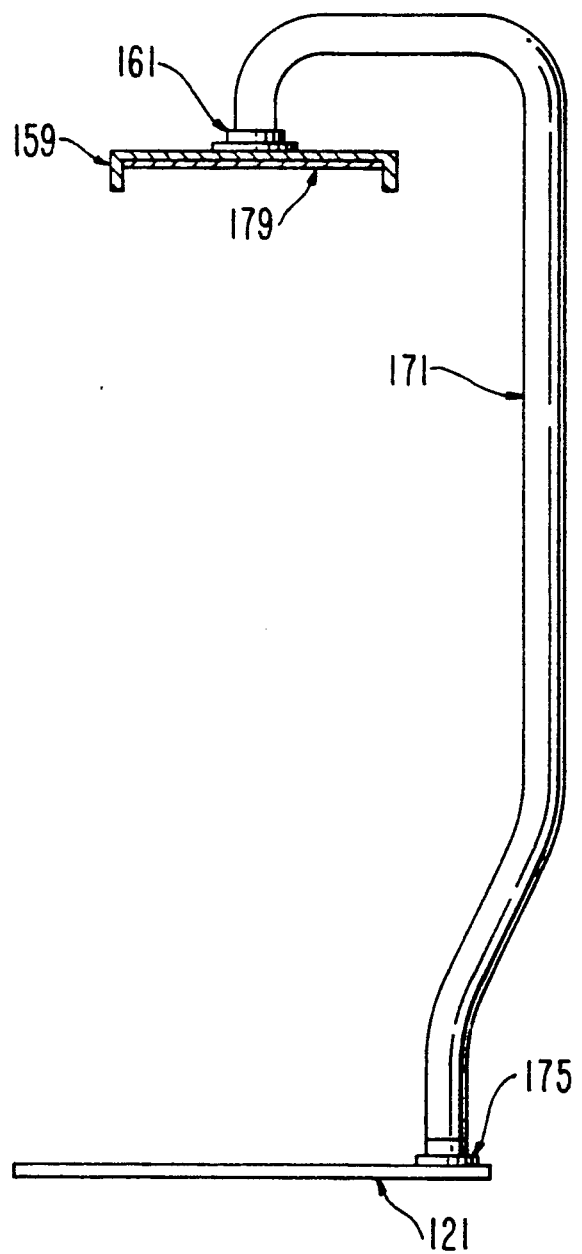
FIG. 5 is a plan view of the gas recirculation pipe.

FIG. 4A is a sectional drawing showing 161 the recirculated gas piping connection to the axial fan housing reference 171 FIG. 5, 157 the desiccant crystals used only if water must be precluded from the organic material in the tank, 167 the containment cartridge for the desiccant crystals and 159 the axial fan removable housing cover.

FIG. 5 is a drawing of the gas recirculation pipe between the axial flow fan housing cover 159 and the pipe flange connection 151 both shown in FIG. 4A and the top cover plate 121. 171 is the gas recirculation pipe and 175 is the pipe flange attached with removal screws to 121.

FIG. 6 is an assembly drawing that includes the upper enclosure plate 121, the condenser and gas heat exchanger, the axial flow fan, the recirculated gas pipe and the clamping arrangement using 177 bolts with nuts. All the exterior surfaces shown in FIG. 6, FIG. 1, FIG. 1D and 1E will have foam insulation to prevent the condensation of water vapors on their exterior surfaces. The drawing shows the mounting on the tank 185 and the outboard support members 183 and 181.

Figure 7:
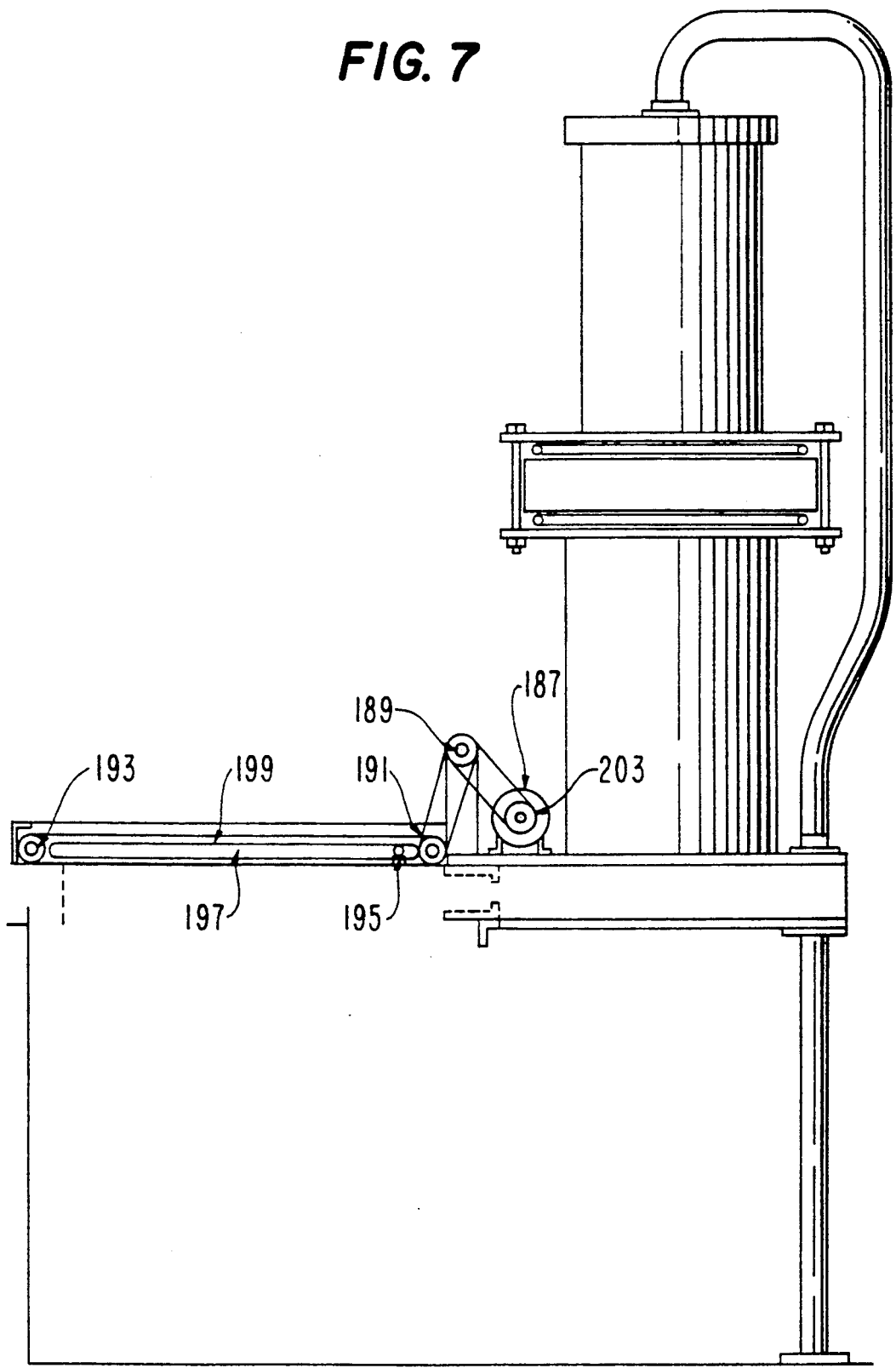
FIG. 7 is an elevation view drawing of the tank cover and closure system.
Figure 7A:
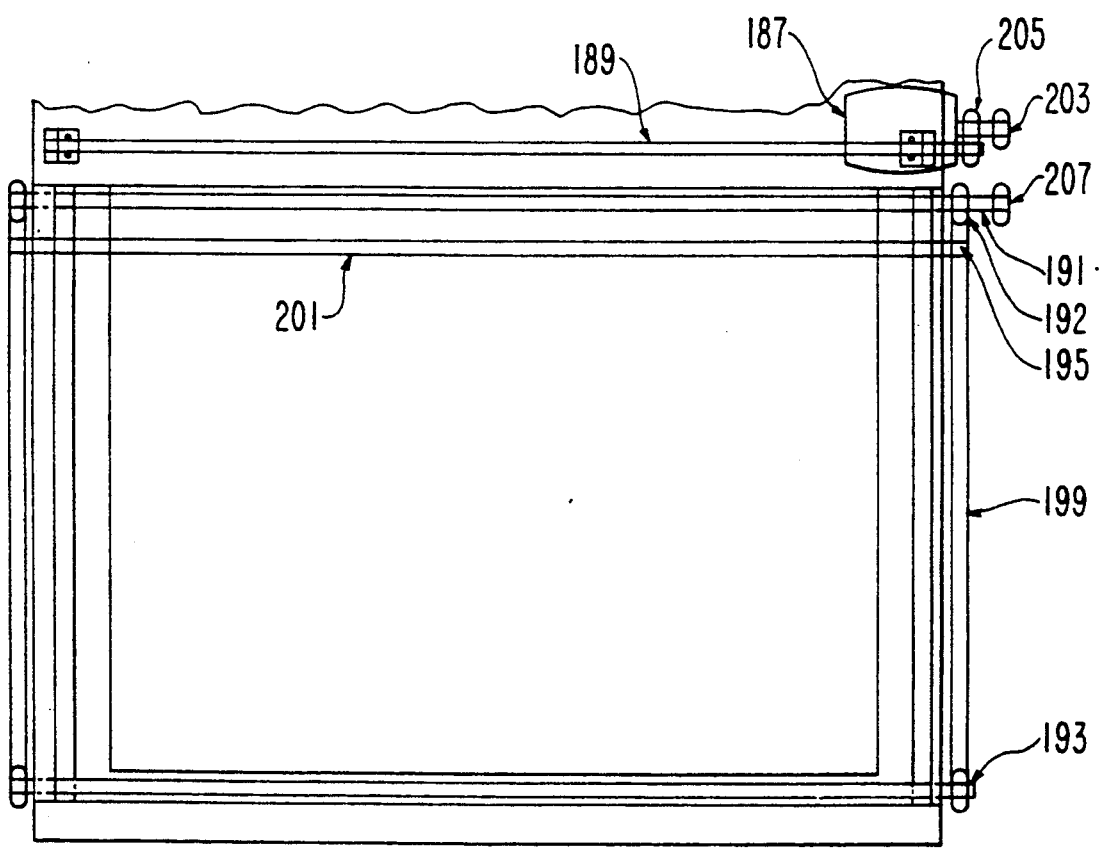
FIG. 7A is a plan view drawing of the tank cover and closure system.

FIG. 7 is an elevation view and FIG. 7A is a plan view of the tank cover mechanism and its drive system. 187 the torque limiting single cycle reversing drive motor. 205 is a drive sprocket on the motor shaft 187 and for a continuous chain drive to the storage roller sprocket 189. 203 is a second drive sprocket on the motor shaft 187 for a continuous chain drive to the drive and guide roller sprocket 191. As an option, the drive for the drive and guide roller 191 can be equipped with the 203 drive sprocket to allow the drive of the storage roller to be made from the drive and guide roller as needed by the weight of the tank closure material. The chemical resistant rubber or other material is attached to the 201 drawbar. 195 is a drive pin and guide roller attached to the continuous chain 199. The continuous chain 199 is driven by sprocket 192 located on the drive and guide roller 191. 193 is an idler sprocket for the continuous chain 199, 197 is a guide track for the 195 drive pin and guide roller.

I claim:

1. A process for preventing escape into the atmosphere of vapors of an organic material from a tank or container at least periodically open at its top to the atmosphere and containing said organic material in liquid state, comprising:

providing a chilled gas blanket over a surface of said organic material in liquid state at a top section of said tank or container;

collecting gas from said chilled gas blanket at a predetermined level of said tank or container and passing the collected gas through a condenser heat exchanger thereby cooling said collected gas and condensing any organic vapor in said collected gas;

recirculating the cooled collected gas to said top secton of said tank or container at said predetermined level, thereby maintaining said chilled gas blanket uniformly over said surface of said organic material in liquid state including an interface of said liquid state and a gas phase; and returning any condensed organic vapor to said organic material in liquid state in said tank or container.

2. A process according to claim 1, wherein said condensed organic vapor is returned to said organic material in liquid state at a point below said surface of said organic material in said liquid state.

3. A process according to claim 1, wherein said gas is air.

4. A process according to claim 1, wherein said gas is nitrogen.

5. A process according to claim 1, wherein chilled water is passed through said condenser heat exchanger to cool said collected gas.

6. A process according to claim 1, wherein said tank or container is provided with a cover at its top and wherein said cover is periodically opened.

7. A process for preventing escape into the atmosphere of vapors of an organic material from a tank or container at least periodically open at its top to the atmosphere and containing said organic material in liquid state, comprising:

providing a chilled gas blanket over a surface of said organic material in liquid state at a top section of said tank or container;

collecting as from said chilled gas blanket and passing the collected gas through a condenser heat exchanger thereby cooling said collected gas and condensing any organic vapor in said collected gas;

recirculating the cooled collected gas to said top section of said tank or container, thereby maintaining said chilled gas blanket uniformly over said surface of said organic material in liquid state including an interface of said liquid state and gas phase; and returning any condensed organic vapor to said organic material in liquid state in said tank or container, wherein recirculation of said cooled collected gas is stopped when said cover is open.

8. A process for preventing escape into the atmosphere of vapors of an organic material from a tank or container at least periodically open at its top to the atmosphere and containing said organic material in liquid state, comprising:

providing a chilled gas blanket over a surface of said organic material in liquid state at a top section of said tank or container;

collecting gas from said chilled gas blanket and passing the collected gas through a condenser heat exchanger thereby cooling said collected gas and condensing any organic vapor in said collected gas;

recirculating the cooled collected gas to said top section of said tank or container, thereby maintaining said chilled gas blanket uniformly over said surface of said organic material in liquid state including an interface of said liquid state and a gas phase; and returning any condensed organic vapor to said organic material in liquid state in said tank or container, wherein said tank or container has a square horizontal cross secton and wherein said gas is collected from one side of said square cross section and said chilled gas blanket is provided from the other three sides of said square cross section.

9. A process for preventing escape into the atmosphere of vapors of an organic material from a tank or container at least periodically open at its top to the atmosphere and containing said organic material in liquid state, comprising:

providing a chilled gas blanket over a surface of said organic material in liquid state at a top section of said tank or container;

collecting gas from said chilled gas blanket and passing the collected gas through a condenser heat exchanger thereby cooling said collected gas and condensing any organic vapor in said collected gas;

recirculating the cooled collected gas to said top section of said tank or container, thereby maintaining said chilled gas blanket uniformly over said surface of said organic material in liquid state including an interface of said liquid state and a gas phase; and returning any condensed organic vapor to said organic material in liquid state in said tank or container, wherein said tank or container has a substantially circular horizontal cross section and wherein said gas is collected from approximately 25% of said circular cross section and said chilled gas blanket is provided from approximately 75% of said circular cross section.

10. An apparatus for storage of organic material in liquid state while preventing escape into the atmosphere of vapors of said organic material, comprising:

a tank or container at least periodically open at its top to the atmosphere and container said organic material in liquid state;

means for providing chilled gas through a distributor at a top section of said tank or container and for maintaining a chilled gas blanket uniformly over a surface of said organic material in liquid state at top section of said tank or container including an interface o said liquid state and a gas phase;

a condenser heat exchanger for cooling gas and condensing any organic vapor in said gas;

means for collecting gas from said chilled gas blanket through an inlet and passing the collected gas through said condenser heat exchanger;

means for recirculating the cooled collected gas from said condenser heat exchanger to said means for providing and maintaining a chilled gas blanket; and means for returning any condensed organic vapor to said organic material in liquid state in said tank or container, wherein said distributor and inlet the are at the same level of said tank or container.

* * * * *